United States Patent
Tharpe, Jr.

(10) Patent No.: US 8,206,471 B1
(45) Date of Patent: Jun. 26, 2012

(54) SYSTEMS, APPARATUS AND METHODS FOR OPTIMIZING THE PRODUCTION OF ENERGY PRODUCTS FROM BIOMASS, SUCH AS SAWMILL WASTE

(75) Inventor: Johnny M. Tharpe, Jr., Albany, GA (US)

(73) Assignee: American Bio Energy Converting Corp., Albany, GA (US)

( * ) Notice: Subject to any disclaimer, the term of this patent is extended or adjusted under 35 U.S.C. 154(b) by 600 days.

(21) Appl. No.: 12/466,501

(22) Filed: May 15, 2009

Related U.S. Application Data (63) Continuation-in-part of application No. 12/361,743, filed on Jan. 29, 2009.

(60) Provisional application No. 61/053,386, filed on May 15, 2008.

(51) Int. Cl.
 *B01J 7/00* (2006.01)
 *C10J 3/00* (2006.01)
 *C01B 3/36* (2006.01)
 *C01B 6/24* (2006.01)
 *C01B 3/02* (2006.01)

(52) U.S. Cl. .......... 48/197 R; 48/111; 48/209; 423/644; 423/648.1

(58) Field of Classification Search ............. 48/197 R, 48/111, 209; 423/644, 648.1
See application file for complete search history.

(56) References Cited

U.S. PATENT DOCUMENTS

| 4,326,382 A | 4/1982 | Baardson |
| 4,414,813 A | 11/1983 | Knapp |
| 4,431,405 A * | 2/1984 | Eatherton ............... 432/72 |
| 4,638,629 A | 1/1987 | Archer et al. |
| 5,341,637 A | 8/1994 | Hamrick |
| 5,471,937 A | 12/1995 | Kosky et al. |
| 5,513,444 A | 5/1996 | Lindberg |
| 5,626,638 A | 5/1997 | Valkanas |
| 5,666,890 A | 9/1997 | Craig |
| 7,272,934 B2 | 9/2007 | Chandran et al. |
| 2004/0020207 A1 | 2/2004 | Thiessen |
| 2006/0000701 A1* | 1/2006 | Smith et al. ............... 202/118 |
| 2006/0101663 A1 | 5/2006 | Perin et al. |
| 2006/0225424 A1 | 10/2006 | Elliott et al. |
| 2006/0254081 A1 | 11/2006 | Carin et al. |
| 2009/0139851 A1* | 6/2009 | Freel ............... 201/23 |

FOREIGN PATENT DOCUMENTS

| CA | 2441692 | 3/2005 |
| DE | 4342165 | 5/1995 |
| DE | 19729585 | 10/1998 |
| EP | 0165839 | 12/1985 |
| JP | 8-49822 | 2/1996 |
| WO | 2007113330 | 10/2007 |

* cited by examiner

*Primary Examiner* — Matthew Merkling
(74) *Attorney, Agent, or Firm* — Allen, Dyer, Doppelt, Milbrath & Gilchrist, P.A.

(57) ABSTRACT

Efficient biomass conversion systems, methods and apparatus utilize a fast pyrolysis unit installed at a sawmill or similar location where substantial quantities of biomass are generated, with the biomass generated at the sawmill fed into the fast pyrolysis unit under pyrolytic reaction conditions, and with exhaust gases containing entrained matter resulting from the pyrolytic reactions being separated into constituent char and bio-fuel constituents.

15 Claims, 9 Drawing Sheets

SYSTEMS, APPARATUS AND METHODS FOR OPTIMIZING THE PRODUCTION OF ENERGY PRODUCTS FROM BIOMASS, SUCH AS SAWMILL WASTE

CROSS-REFERENCE TO RELATED APPLICATIONS

This application claims priority to provisional application Ser. No. 61/053,386, filed May 15, 2008, and is a continuation-in-part of application Ser. No. 12/361,743 filed Jan. 29, 2009.

BACKGROUND

The present invention relates generally to systems, apparatus, and methods for the production of energy products from carbonizable material such as biomass, particularly systems, apparatus and methods that employ fast pyrolytic reactions.

Today, the United States faces substantial environmental issues from continuing reliance on polluting energy sources such as coal, natural gas, nuclear power and hydroelectric power. The burning of fossil fuels, such as coal and natural gas, results in the emission of excessive amounts of carbon dioxide into the atmosphere. The use of nuclear power raises the specter of ecological damage through the accidental release of radiation into the environment, as well as difficulties in safely disposing of spent nuclear fuel. Hydroelectric projects can disrupt local ecosystems, resulting in major reductions in fish populations, negative impacts on native and migratory birds and damage to the dammed river. As a result, people are looking for alternatives to ecologically-harmful sources of energy. In recent years, biomass has gained popularity as an environmentally-sound alternative energy source.

Biomass, or the fuel products derived from it, can be burned to produce power. Unlike fossil fuels, however, carbon dioxide released from the burning of biomass does not contribute to the overall carbon dioxide content of the atmosphere. This is true because biomass is part of the world's current atmospheric carbon cycle. For this reason, biomass is viewed as a renewable, carbon-neutral fuel.

Forest products processing facilities are substantial sources of biomass. The typical facility uses some of its biomass in the creation of its products, while the remainder of the biomass is seen as a byproduct. One type of forest products processor that produces a large volume of biomass byproduct is a chip mill that processes only small-sized timber. In the chip mill, logs are debarked and then ground into chips for transporting to other mills for further processing.

Another type of sawmill is a chip and saw facility ("CNS facility"). A CNS facility produces dimensional lumber from timber that has a diameter ranging from mid-sized to small. Substantial sources of biomass are also available from other facilities, such as large log processing plants, plywood plants, and OSB plants, among others.

A typical CNS facility will generate an average of more than five-hundred tons of dry biomass byproducts per day. (According to Marks Mechanical Engineering Handbook, the standard for "dry" is defined as twelve percent moisture content or less.) These biomass byproducts typically consist of white chips, bark, sawdust, and wood shavings. The white chips produced by a CNS facility are generally sold to paper-producing mills for processing into paper and cellulose products. The bark, sawdust and shavings are either used at the CNS facility itself as a thermal energy source or sold as a byproduct. When sold as a byproduct, the biomass generally fetches less than twenty dollars a ton. This is far less than the value of its energy content, as shown by Table 1 below.

TABLE 1

Typical Production and Pricing of Biomass from a CNS facility

| Byproduct | Water Content | Daily Production | Value Per Ton | Energy Per Pound | Energy Val Per Ton* |
|---|---|---|---|---|---|
| Bark | 10% | 300 tons | $9.91 | 6,500 Btu | $224.91 |
| White Chips | 40% | 700 tons | $19.13 | 5,000 Btu | $173.00 |
| Sawdust | 40% | 120 tons | $13.00 | 5,000 Btu | $173.00 |
| Shavings | 10% | 120 tons | $24.50 | 8,666 Btu | $299.86 |

*The dollar value of the energy contained within a ton of a given type of biomass is based on a sale price of $100 for a 42-gallon barrel of crude oil having an energy content of 5,780,000 Btu.

Fast pyrolysis is one process used to produce energy products from biomass. Fast pyrolysis utilizes temperatures of between four-hundred-fifty and six-hundred degrees Celsius to rapidly heat biomass in the absence of oxygen. This results in the creation of three products: bio-oil, char, and non-condensing gases. All three products are combustible. The energy content of each of these products is listed in Table 2 below, along with the approximate percentage of each product typically yielded by the process.

TABLE 2

Energy Content of Products Produced by Fast Pyrolysis

| Product | Energy Content | % of Product Yielded |
|---|---|---|
| Bio-oil | 8,000 Btu per pound | 70.0% |
| Char | 12,000 Btu per pound | 14.3% |
| Non-condensing Gases | 4,000 Btu per pound | 13.4% |

Fuel needed to create and maintain such high temperatures in systems utilizing fast pyrolysis can represent a major operational expense. For this reason, it is recognized as desirable in the art to create systems that make the most of the heat produced. There are a number of strategies used to accomplish this.

One strategy employs techniques meant to optimize the transfer of thermal energy to individual particles of biomass within a pyrolysis chamber. This can be accomplished through the use of organic heat carriers such as hot char and inorganic heat carriers, such as sand. These particularized heat carriers circulate within the pyrolysis chamber and radiate heat to the particles of biomass. Other techniques involve rapidly moving particles of feedstock within a pyrolysis chamber so as to force the particles into nearly continual contact with the hot walls of the chamber. Still other techniques circulate a heated gas stream through a pyrolysis chamber to transfer heat to the particles of biomass. Another strategy involves capturing the hot exhaust resulting from pyrolytic reactions in the pyrolysis chamber and recirculating that hot exhaust to other parts of the system. Yet another strategy involves insulating the pyrolysis chamber to deter heat loss through the walls of the chamber.

What is needed are fast pyrolysis systems that improve upon the conservation and reuse of existing heat generated by the systems. Also needed are fast pyrolysis systems and apparatus that may be easily collocated with sawmill facilities as a means for creating bio-oil, bio-plus and other energy products on site while utilizing heat recovery techniques.

SUMMARY OF THE INVENTION

The present invention is directed to systems, apparatus and methods utilizing fast pyrolysis techniques to produce bio-oil in a facile manner when collocated with a facility such as a sawmill that generates biomass as a by-product, and in which the exhaust from the fast pyrolysis process is used to increase efficiency. To achieve these and other objectives, the present invention contemplates the provision of compact systems and apparatus that employ a pyrolysis unit comprising generally concentric intercommunicating chambers for pyrolyzing biomass while capturing and reusing heat that might otherwise be lost to the outside environment. Various embodiments are shown below to achieve these objectives.

In accordance with the present invention, an apparatus, system and method are provided that employs a pyrolysis unit comprising concentric, or generally concentric, intercommunicating chambers for pyrolysizing biomass to create energy products. The pyrolysis unit captures and reuses heat that might otherwise be lost to the outside environment through the walls of a single-chambered unit. In addition, the unique, generally concentric construction of the intercommunicating chambers are used for conserving and reusing system-generated heat, such as the recirculation of hot exhaust resulting from pyrolytic reactions.

In a first embodiment, a pyrolysis unit embodying features of the present invention includes an elongated, tubular combustion chamber and at least one elongated, tubular pyrolysis chamber. The chambers are configured generally concentrically so that the combustion chamber is located substantially within the larger-diameter pyrolysis chamber. In embodiments including multiple pyrolysis chambers, each of the elongated, tubular pyrolysis chambers will be arranged with the combustion chamber in a generally concentric manner such that the combustion chamber is the innermost chamber, an inner pyrolysis chamber substantially surrounds the combustion chamber, and each successive pyrolysis chamber substantially surrounds a previous pyrolysis chamber.

One end of the combustion chamber is in communication with a proximate end of the pyrolysis chamber. In embodiments including multiple pyrolysis chambers, an opposite end of the innermost pyrolysis chamber is also in communication with a proximate end of a next-innermost pyrolysis chamber. An opposite end of the next-innermost pyrolysis chamber is, in turn, in communication with a proximate end of a successive pyrolysis chamber, and so on for each successive pyrolysis chamber. In this way, a directed, generally-deoxygenated, heated gas stream flowing from the combustion chamber flows through each pyrolysis chamber sequentially. The heated gas stream reverses direction at each junction of chambers such that the stream flows in a first direction through one chamber, and then flows in a second direction opposite to the first direction through an adjacent chamber. Each pair of adjacent chambers shares a common wall that separates the gas in each chamber while still conducting heat. For example, the combustion chamber and the inner pyrolysis chamber share the same wall. In addition to heat radiating from the heated gas stream passing through the chambers, each common wall of the pyrolysis unit also conducts heat from one chamber to the next. At the designed temperature of the combustion exhaust, the wall of the combustion chamber will also provide significant radiant heat transfer to the biomass flowing through the first pyrolysis chamber, thereby increasing the rate of heat transfer to the biomass.

A heat source is used to produce the directed, generally-deoxygenated heated gas stream. In one embodiment, this heat source is a burn enclosure with an igniter and is configured as part of the pyrolysis unit. A fuel-air mixture is injected under pressure into a first end of the burn enclosure and ignited by the igniter. A second opposite end of the burn enclosure joins one end of a combustion chamber. The heated gas stream flows through the combustion chamber and out of the opposite end where it enters one or more pyrolysis chambers, each in turn. Alternate embodiments use other heat sources, such as a gas turbine in conjunction with a burn enclosure.

Biomass is introduced into the pyrolysis unit and pyrolysized by the generally-deoxygenated, combusted gas stream, resulting in the creation of primarily non-condensing gases and bio-oil vapor, along with entrained char. This exhaust and its entrained matter are collected from the pyrolysis unit and directed to other parts of the system where the bio-oil vapor and char are both separated from the exhaust and collected.

In some embodiments, a cyclone separator is used to separate entrained char from the exhaust. Also used in some embodiments is a biomass feed bin for introduction of biomass into the pyrolysis unit. Exhaust separated from its bio-oil vapor and char is passed through the biomass feed bin whereupon the biomass acts as a filter, cleaning remaining entrained matter from the exhaust. Also in some embodiments, char separated from the exhaust is introduced back into the pyrolysis unit to aid in producing the generally-deoxygenated heated gas stream. In yet another embodiment, the exhaust from a gas turbine is used as a heat source to promote an efficient fast pyrolysis.

The techniques employed in the various embodiments of this invention to recognize the full energy potential of the biomass by using previously wasted thermal energy that has been deoxygenated to promoted fast pyrolysis is designated as "the Marion cycle." The Marion cycle permits the use of a number of different fields to deoxygenate the exhaust, adding flexibility to the process. The Marion cycle is also capable of using the energy of the exhaust for purposes other than fast pyrolysis, such as drying raw biomass prior to processing.

Preferably, each of the fast pyrolysis systems of this invention is compact and easily transported between locations of biomass sources, such as sawmills.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION

A first embodiment of a fast pyrolysis system is depicted in FIGS. 1-4 and designated generally by reference numeral 10.

Figure 1:
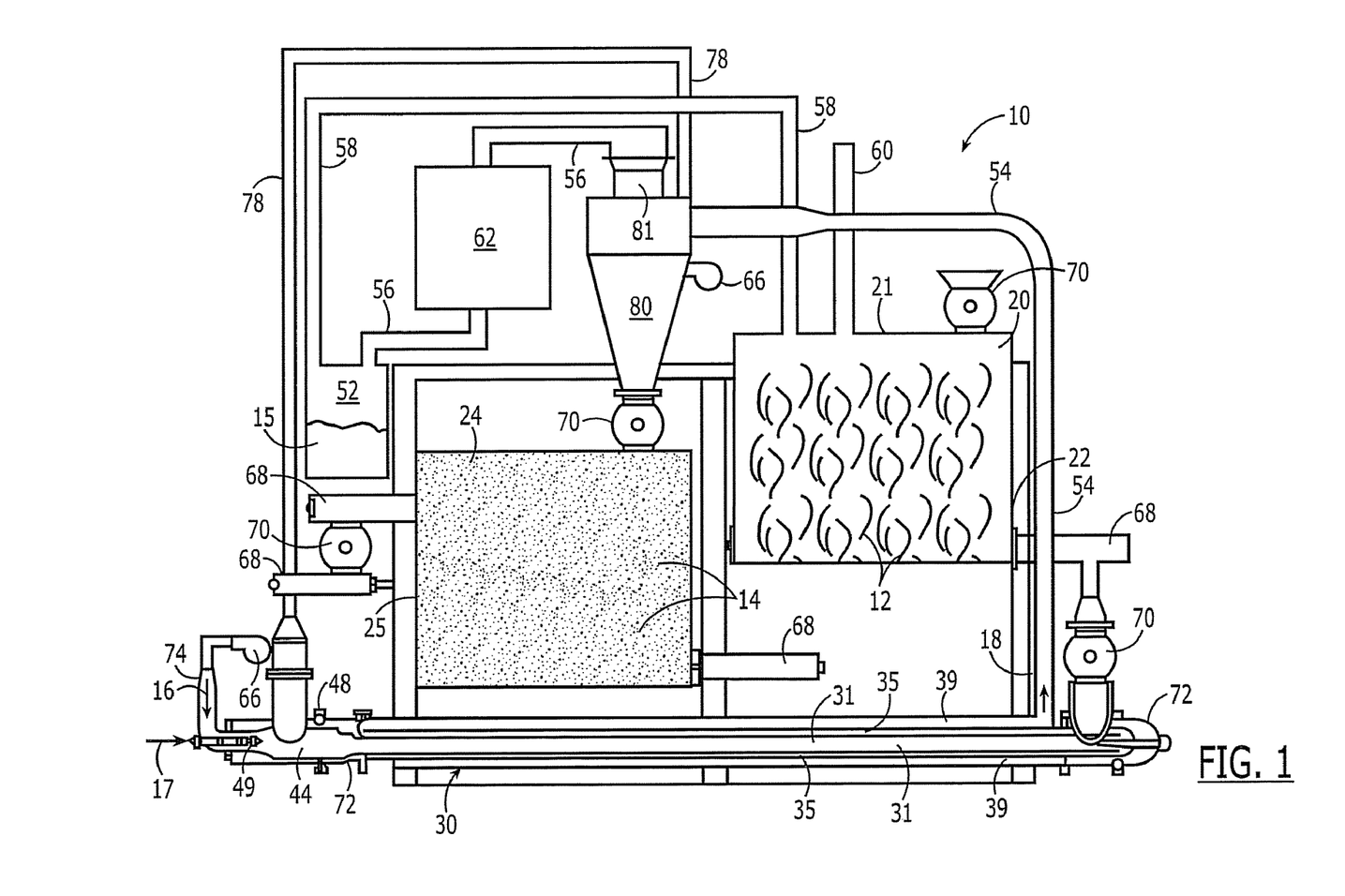
FIG. 1 is a schematic view of a first embodiment of a pyrolysis system in accord with the present invention.

Referring now to FIG. 1, the system 10 comprises a biomass feed bin 20 for receiving and delivering biomass 12 that is to be pyrolysized. The biomass feed bin 20 is generally enclosed to provide greater control over the channeling of exhaust 18 (shown as an arrow) from pyrolytic reactions that is fed into the feed bin 20, as described below with reference to FIG. 1. The biomass 12 is fed through a top 21 of the feed bin 20 using a rotary air lock 70. The biomass 12 is delivered from the feed bin 20 by an auger 68 attached to a lower portion 22 of the biomass feed bin 20, as described below with reference to FIGS. 1 and 2. In this way, the biomass feed bin 20 continually cycles new biomass 12 through the system 10.

Continuing with FIG. 1, the biomass feed bin 20 accepts raw biomass 12. The present embodiment envisions receiving this biomass 12 primarily from sawmills, particularly CNS facilities. The biomass 12 will typically not need to be ground to a smaller size because it will already be of a size suitable for use in the system 10. If the biomass 12 does need to be ground, however, the biomass 12 will be ground prior to placing the biomass 12 in the biomass feed bin 20. Note that in the present embodiment, an optimal size for particles of biomass 12 used in the concentric-chambered pyrolysis system 10 are envisioned to be particles 12 having no side generally greater than one-quarter inch in length. In alternate embodiments, however, items of biomass 12 having substantially larger dimensions may be used. Note also that in the present embodiment, items of biomass 12 are envisioned to consist generally of wood chips, sawdust, bark, wood shavings, and the like. Note further that in alternate embodiments, the use of biomass 12 of varying types received from numerous different sources may be used.

Still referring to FIG. 1, some biomass 12 fed into the system 10 might require drying prior to undergoing pyrolysis. Biomass 12 with a moisture content of approximately fifteen percent or less by weight can be subjected to pyrolysis without prior drying. Green biomass 12, however, will generally have a moisture content of about fifty percent by weight, as opposed to dry biomass 12 that generally will have a moisture content of about ten percent. The green biomass 12 can be blended with the drier biomass 12 to achieve a combined moisture content of fifteen percent or less. If such blending of the biomass 12 is insufficient to achieve a fifteen percent moisture content by weight, then the biomass 12 will need to be dried prior to subjecting the biomass 12 to pyrolysis. Optimally, the biomass 12 subjected to pyrolysis will have a moisture content of no more than twelve percent by weight. In some cases the biomass 12 may be too dry, in which case moisture can be added.

Figure 2:
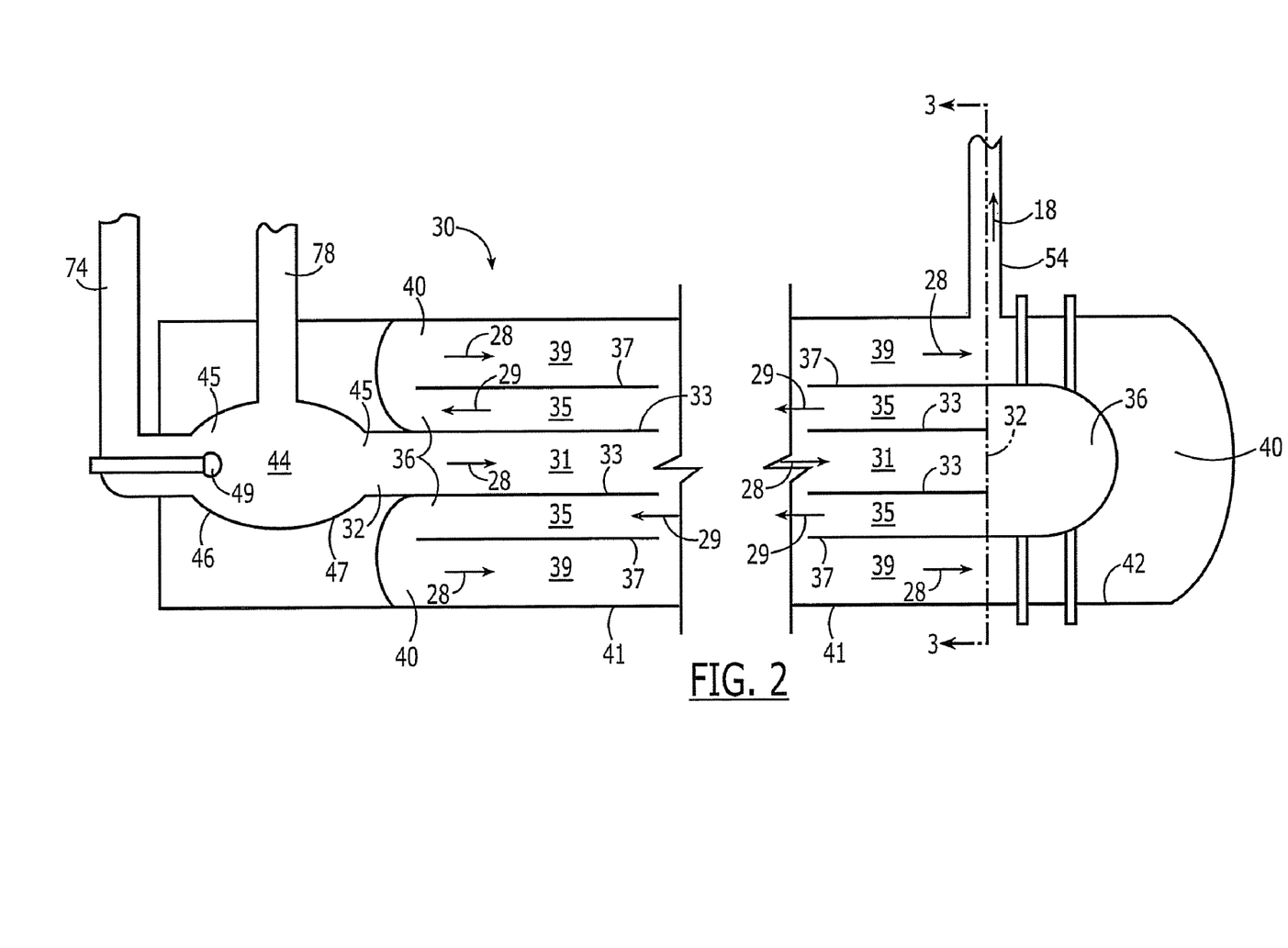
FIG. 2 is a schematic view of a concentric chamber pyrolysis unit employed in the embodiment of FIG. 1.

Referring now to FIG. 2, the system 10 includes a pyrolysis unit 30. The pyrolysis unit 30 includes a burn enclosure 44, an igniter 49, a combustion chamber 31, an inner pyrolysis chamber 35, and an outer pyrolysis chamber 39. The burn enclosure 44 is in the general shape of an elongated tube open at opposing ends 45. A fuel-air input duct 74 is attached to the end 45 of a forward portion 46 of the burn enclosure 44, while the igniter 49 is attached proximate to the end 45 of the forward portion 46. Insulation 72 (see FIG. 1) is installed around the burn enclosure 44 to reduce the amount of heat lost to the surrounding environment.

Continuing with FIG. 2, the combustion chamber 31, the inner pyrolysis chamber 35, and the outer pyrolysis chamber 39 are each also in the general shape of an elongated tube, with the three chambers 31, 35, 39 arranged generally concentrically. The combustion chamber 31 is innermost, the inner pyrolysis chamber 35 surrounds the combustion chamber 31, and the outer pyrolysis chamber 39 is outermost, surrounding both the combustion chamber 31 and the inner pyrolysis chamber 35. An end 45 of a rearward portion 47 of the burn enclosure 44 is connected to a proximate end 32 of the combustion chamber 31, while an opposing distal end 32 of the combustion chamber 31 extends into but is not attached to a proximate end 36 of the inner pyrolysis chamber 35. An opposing distal end 36 of the inner pyrolysis chamber 35 extends into but is not attached to a proximate end 40 of the outer pyrolysis chamber 39.

Regarding FIG. 2, note that in alternate embodiments it is possible for a pyrolysis unit 30 to comprise as few as two chambers, for example a combustion chamber 31 and a pyrolysis chamber. In other alternate embodiments, it is possible that a pyrolysis unit 30 will have additional chambers, for example chambers in addition to a combustion chamber 31, an inner pyrolysis chamber 35, and an outer pyrolysis chamber 39. The chambers of a pyrolysis unit can be arranged in a generally eccentric configuration, as opposed to a generally concentric configuration.

Figure 3:
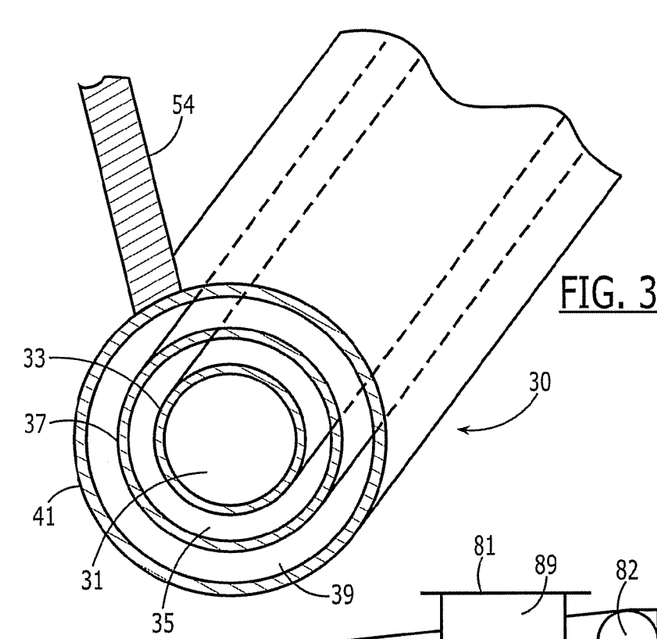
FIG. 3 is a cross-sectional perspective view of FIG. 2, taken along line 3-3.

Referring now to FIG. 3, each of the three chambers 31, 35, 39 of the pyrolysis unit 30 shares a wall 33, 37 with one other chamber 31, 35, 39. A common wall 33 forms the wall 33 of the combustion chamber 31 as well as the inner wall 33 of the inner pyrolysis chamber 35. Another common wall 37 forms the outer wall 37 of the inner pyrolysis chamber 35 and also the inner wall 37 of the outer pyrolysis chamber 39. In this way, the three chambers 31, 35, 39 function as a heat exchanger, promoting heat transfer in three ways. First, conductive heat transfer through the common walls 33, 37 of the chambers 31, 35, 39. Second, concurrent flow heat transfer is effected by the combusted gas stream 28, 29 (shown as arrows in FIG. 2) and char 14 to the biomass undergoing pyrolysis, as described below with reference to FIGS. 1 and 2. Third, countercurrent flow heat transfer is effected by the gas stream 28, 29 flowing throughout the chambers 31, 35, 39. Insulation 72 (see FIG. 1) is installed adjacent an interior surface 42 (see FIG. 2) of an outer wall 41 of the pyrolysis unit 30 to reduce the amount of heat lost to the surrounding environment. The generally concentric configuration of the pyrolysis unit 30 allows for reuse of heat that would otherwise be lost to the surrounding environment through an outer wall of a single-chambered pyrolysis unit.

Referring now to FIG. 1, fuel 17 (shown as an arrow), along with outside air 16 (shown as an arrow) propelled by a blower 66, are introduced into the burn enclosure 44 under pressure through the fuel-air input duct 74. Combustion of the fuel-air 17, 16 mixture produces heat and removes oxygen from the burn enclosure 44 and the attached combustion chamber 31. A variety of fuels 17 can be used for this purpose, such as fuel oil or bio-oil 15.

Continuing with FIG. 1, the char 14 along with air 16 are also introduced into the burn enclosure 44. The air 16 need not necessarily be preheated. The char 14 is fed from a char bin 24 by a first auger 68 attached to a middle portion 25 of the char bin 24. The first auger 68 conveys the char 14 out of the char bin 24 and into a proximate rotary air lock 70. A second auger 68 receives the char 14 from the rotary air lock 70 and delivers the char 14 into a char-air input duct 78 that leads into the burn enclosure 44. The preheated air 16 comes from a cooling duct 83 (see FIG. 4) of a cyclone separator 80 that is used to separate entrained char 14 from the exhaust 18 (shown as an arrow) of previous pyrolytic reactions, as described below with reference to FIG. 4. The cooling duct 83 connects to the char-air input duct 78 to convey the preheated air 16 to the burn enclosure 44. An end of the char-air input duct 78 is attached to a top 48 of the burn enclosure 44. The char-air 14, 16 mixture exits the end of the duct 78 and enters the burn enclosure 44 through the top 48. A key function of the char-air 14, 16 mixture is to burn off any excess oxygen otherwise remaining in the burn enclosure 44 and combustion chamber 31 following combustion of the fuel-air 17, 16 mixture.

Still referring to FIG. 1, the igniter 49 ignites the fuel-air 17, 16 mixture. The ignited fuel-air 17, 16 mixture, in turn, ignites the char-air 14, 16 mixture. Combustion begins generally in the burn enclosure 44 and continues into the combustion chamber 31 where the fuel-air 17, 16 and char-air 14, 16 mixtures are substantially fully combusted. Although it is preferable that all of the oxygen remaining in the burn enclosure 44 and combustion chamber 31 be consumed, it is not required. Feeding of the fuel-air 17, 16 and char-air 14, 16 mixtures, along with ignition of the mixtures, is done in a continual sequence during system 10 operation.

Continuing with FIG. 1, to burn off any excess oxygen that would otherwise remain in the burn enclosure 44 and combustion chamber 31 following ignition of the fuel-air 17, 16 mixture requires that a certain minimum amount of char 14 be present in the burn enclosure 44. During typical system 10 operation, however, more than this minimum amount of char 14 is introduced into the burn enclosure 44. This results in excess char 14 being present in the combustion chamber 31 following combustion of the fuel-air 17, 16 and char-air 14, 16 mixtures. Individual particles of this excess char 14 are greatly by the combustive reaction. The particles of excess char 14 radiate heat to their surroundings as the char 14 travels through the combustion 31, inner pyrolysis 35, and outer pyrolysis chambers 39. Eventually, the excess char 14 becomes entrained within exhaust 18 of a new pyrolysis reaction, with the excess char 14 mixing with newly-pyrolysized char 14, as described below with reference to FIGS. 1 and 2. In an alternate embodiment described with reference to FIG. 6, a gas turbine is used as a combustion source for providing heat and deoxygenation in addition to or in place of a burn enclosure 44.

Referring now to FIG. 2, the substantially deoxygenated, continuous heated gas stream 28, 29 (shown as arrows) produced from the continual combustion of the fuel-air 17, 16 and char-air 14, 16 mixtures (see FIG. 1) flows out of the rearward portion 47 of the burn enclosure 44 and throughout the combustion chamber 31. The continual production of the heated gas stream 28, 29 from the burn enclosure 44 and the combustion chamber 31, together with an impetus provided by injection of the fuel-air 17, 16 mixture into the burn enclosure 44 under pressure, propels the heated gas stream 28, 29 in a first direction 28 through the combustion chamber 31 and into the inner pyrolysis chamber 35. In the inner pyrolysis chamber 35, the heated gas stream 28, 29 changes to a second direction 29 that is opposite to that of the first direction 28 of the stream 28, 29 through the combustion chamber 31. The heated gas stream 28, 29 exits the distal end 36 of the inner pyrolysis chamber and enters the outer pyrolysis chamber 39. In the outer pyrolysis chamber 39, the stream 28, 29 changes back to the first direction 28, which is opposite to that of the second direction 29 of the stream 28, 29 through the inner pyrolysis chamber 35.

Continuing with FIG. 2, in addition to heat radiating from the flow of the heated gas stream 28, 29 through the pyrolysis unit 30, heat from the heated gas stream 28, 29 is also conducted among the three generally concentric chambers 31, 35, 39 through the common walls 33, 37 of the three chambers 31, 35, 39. In this way, the chambers 31, 35, 39 operate as a countercurrent flow heat exchanger. Note that the temperature of the combustion chamber 31 during operation of the system 10 is typically in excess of six-hundred-fifty degrees Celsius.

Referring now to FIGS. 1 and 2, biomass 12 is fed from the biomass feed bin 20 by the auger 68 attached to the lower portion 22 of the biomass feed bin 20. The auger 68 conveys the biomass 12 out of the feed bin 20 and into a proximate rotary air lock 70. The rotary air lock 70, in turn, introduces the biomass 12 into the pyrolysis unit 30 at the distal end 32 of the combustion chamber 31, where the combustion chamber 31 is in communication with the proximate end 36 of the inner pyrolysis chamber 35.

The continuous heated gas stream 28, 29 (shown as arrows in FIG. 2) captures the biomass 12 in its flow and carries the biomass 12 along through the inner pyrolysis chamber 35 toward the distal end 36 of the inner pyrolysis chamber 35, opposite the proximate end 36 of the inner pyrolysis chamber 35 where the biomass 12 entered. As the heated gas stream 28, 29 moves the biomass 12 along, heat radiating from the stream 28, 29 fast pyrolysizes the biomass 12. Optimally, pyrolysis of a particle of biomass 12 takes no more than two seconds. Exhaust 18 (shown as an arrow) resulting from the pyrolytic reaction comprises primarily non-condensing gases, bio-oil vapor and entrained char 14 (see FIG. 1). Note that the non-condensing gases are substantially made up of carbon dioxide, carbon monoxide, and nitrogen. The entrained char 14 includes excess, non-combusted char 14 from the char-air 14, 16 mixture that was introduced into the burn enclosure 44, as described above with reference to FIG. 1. In alternate embodiments, various forms of inert material might be employed to assist in the transfer of heat to biomass that is to be pyrolysized.

Still referring to FIGS. 1 and 2, the exhaust 18 from the pyrolytic reaction, along with any remaining non-pyrolysized biomass 12, reaches the distal end 36 of the inner pyrolysis chamber 35, where the inner pyrolysis chamber 35 communicates with the proximate end 40 of the outer pyrolysis chamber 39. As the exhaust 18 and remaining biomass 12 enter the outer pyrolysis chamber 39, the exhaust 18 and remaining biomass 12 change from flowing in the second direction 29 to flowing in the first direction 28 opposite to that of the second direction 29. As the remaining non-pyrolysized biomass 12 is swept through the outer pyrolysis chamber 39, the remaining biomass 12 is fast pyrolysized by heat from the gas stream 28, 29. Exhaust 18 from this pyrolytic reaction combines with the existing exhaust 18 in the outer pyrolysis chamber 39. In some instances it is possible that a small quantity of oxygen will remain in one or both of the pyrolysis chambers 35, 39 at the time of pyrolysis. In this event, a small amount of the biomass 12 will react with the oxygen and combust rather than pyrolysize.

Continuing with FIGS. 1 and 2, an exhaust duct 54 is fitted to the pyrolysis unit 30 proximate the distal end 40 of the outer pyrolysis chamber 39, opposite the proximate end 40 of the outer pyrolysis chamber 39 where the outer pyrolysis chamber 39 communicates with the inner pyrolysis chamber 35. The exhaust 18 exits the outer pyrolysis chamber 39 and rises along the exhaust duct 54. The exhaust duct 54 leads from the pyrolysis unit 30 and attaches to the cyclone separator 80, as described next with reference to FIG. 4.

Figure 4:
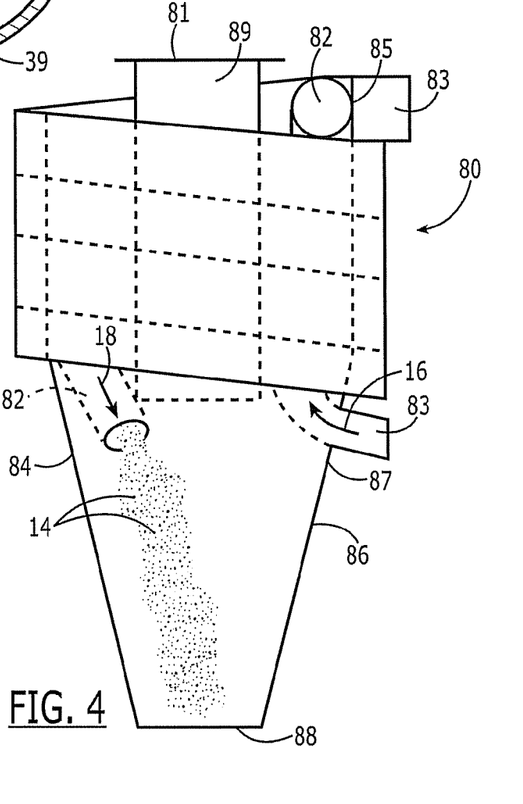
FIG. 4 is a schematic view of a cyclone separator used in the embodiment of FIG. 1.

Referring now to FIG. 4, the cyclone separator 80 comprises a body 84 with a collection cone portion 86, a central exhaust pipe 81, an inflow pipe 82, and the cooling duct 83. The collection cone portion 86 is in the general shape of a cone having an upwardly facing mouth 87 and an opposing open end 88 for collecting and distributing char 14 separated from the exhaust 18 (shown as an arrow) of pyrolysis reactions. The exhaust pipe 81 resides in the approximate center of the body 84 with the collection cone portion 86 located beneath a lower end of the exhaust pipe 81. The exhaust pipe 81 is used for carrying the exhaust 18 out of the cyclone separator 80 following separation of the entrained char 14 from the exhaust 18. The inflow pipe 82 and cooling duct 83 are aligned parallel with each other and share a common wall 85, with the inflow pipe 82 located inwardly of the cooling duct 83. The common wall 85 promotes heat transfer from the exhaust 18 in the inflow pipe 82 to the cooler air 16 in the cooling duct 83. The inflow pipe 82 and cooling duct 83 spiral downwardly together around the central exhaust pipe 81, beginning near an upper portion 89 of the exhaust pipe 81 and descending to a point just above the mouth 87 of the collection cone portion 86.

Continuing with FIGS. 1 and 4, the exhaust duct 54 connects to an end of the inflow pipe 82 that is near the upper portion 89 of the central exhaust pipe 81. The cyclone separator 80 draws the exhaust 18 downwardly through the inflow pipe 82 toward the mouth 87 of the collection cone portion 86. A blower 66 is attached to an end of the cooling duct 83 that is near the mouth 87 of the collection cone portion 86. The blower 66 forces outside air 16 (shown as an arrow) upwardly through the cooling duct 83. The cooler outside air 16 inside the cooling duct 83 absorbs some of the heat of the hotter exhaust 18 inside the inflow pipe 82 through the common wall 85 between the inflow pipe 82 and the cooling duct 83, thereby heating the air 16 and cooling the exhaust 18. The char-air input duct 78 connects to an opposing end of the cooling duct 83 that is near the upper portion 89 of the exhaust pipe 81. The now-heated air 16 flows through the char-air input duct 78 until the air 16 is eventually vented into the burn enclosure 44 along with the char 14 to be combusted. In alternate embodiments, preheated air 16 from a cooling duct 83 is routed to a fuel-air input duct 74 or to both a char-air input duct 78 and a fuel-air input duct 74.

Still referring to FIGS. 1 and 4, as the exhaust 18 spirals downwardly through the inflow pipe 82 toward the mouth 87 of the collection cone portion 86, centrifugal force drives the particles of char 14 entrained within the exhaust 18 toward the common wall 85 between the inflow pipe 82 and the cooling duct 83. As the particles of char 14 exit the end of the inflow pipe 82, the char 14 falls into the mouth 87 of the collection cone portion 86 and exits the open end 88 of the collection cone portion 86. Connected to the open end 88 is a rotary air lock 70. The rotary air lock 70 feeds the char 14 into the char bin 24. A given amount of the char 14 from the char bin 24 will be fed into the burn enclosure 44. Since the char bin 24 is continually filling with char 14 from the cyclone separator 80, char 14 is removed from the char bin 24 to keep the char bin 24 from overflowing. This excess char 14 is removed as an end product of the system 10. Still referring to FIGS. 1 and 4, at this point substantially all of the char 14 will have been removed from the exhaust 18. The substantially char-free exhaust 18 now principally comprises non-condensing gases and bio-oil vapor. This generally char-free exhaust 18 flowing from the end of the inflow pipe 82 rises and exits the cyclone separator 80 through an end of the upper portion 89 of the central exhaust pipe 81 and enters a second exhaust duct 56 attached to the end of the upper portion 89. The exhaust duct 56 transports the exhaust 18 (shown as an arrow) through a bio-oil condensing system 62 that cools the exhaust 18 to a temperature of below one-hundred degrees Celsius. At this temperature, substantially all of the bio-oil vapor condenses out of the exhaust 18 while the non-condensing gases in the exhaust 18 remain in a gaseous state. The exhaust duct 56 leads from the bio-oil condensing system 62 to a bio-oil storage tank 52. The now-liquid bio-oil 15 and the bio-oil-free exhaust 18 empty into the bio-oil storage tank 52. The liquid bio-oil 15 collects in the storage tank 52 and is dispensed from the tank 52 as an end product of the system 10.

Continuing with FIG. 1, a third exhaust duct 58 leads from the bio-oil storage tank 52 to the biomass feed bin 20. The biomass feed bin 20 is generally enclosed to provide greater control over the channeling of the exhaust 18 fed into the feed bin 20, as described above with reference to FIG. 1. The exhaust 18 leaves the third exhaust duct 58 and passes through the biomass feed bin 20. The biomass 12 in the feed bin 20 acts as a filter for the exhaust 18, filtering out of the exhaust 18 any entrained liquid or solid matter. The non-condensing gases of the exhaust 18 then exit the biomass feed bin 20 through an exhaust vent 60 leading to the outer environment. In alternate embodiments, an exhaust vent 60 is attached to the char-air input duct 78 to channel a portion of the cleansed non-condensing gases exiting a biomass feed bin 20 into a burn enclosure 44 to join char 14 that is to be combusted, as described above with reference to FIG. 1.

As shown in the schematic side view of FIG. 1, the system 10 is preferably mounted within a framework of vertical and horizontal structural members 11 which permit the system 10 to be easily mounted on a truck bed, upon a skid or on wheels so as to be easily transported from one biomass source to another as circumstances dictate. In a preferred form, the footprint of the system 10 is such that one or more systems may be mounted upon a flat bed truck, it being understood that two or more systems 10 may be required to handle the biomass output from a large sawmill, such as a CNS facility.

Figure 5:
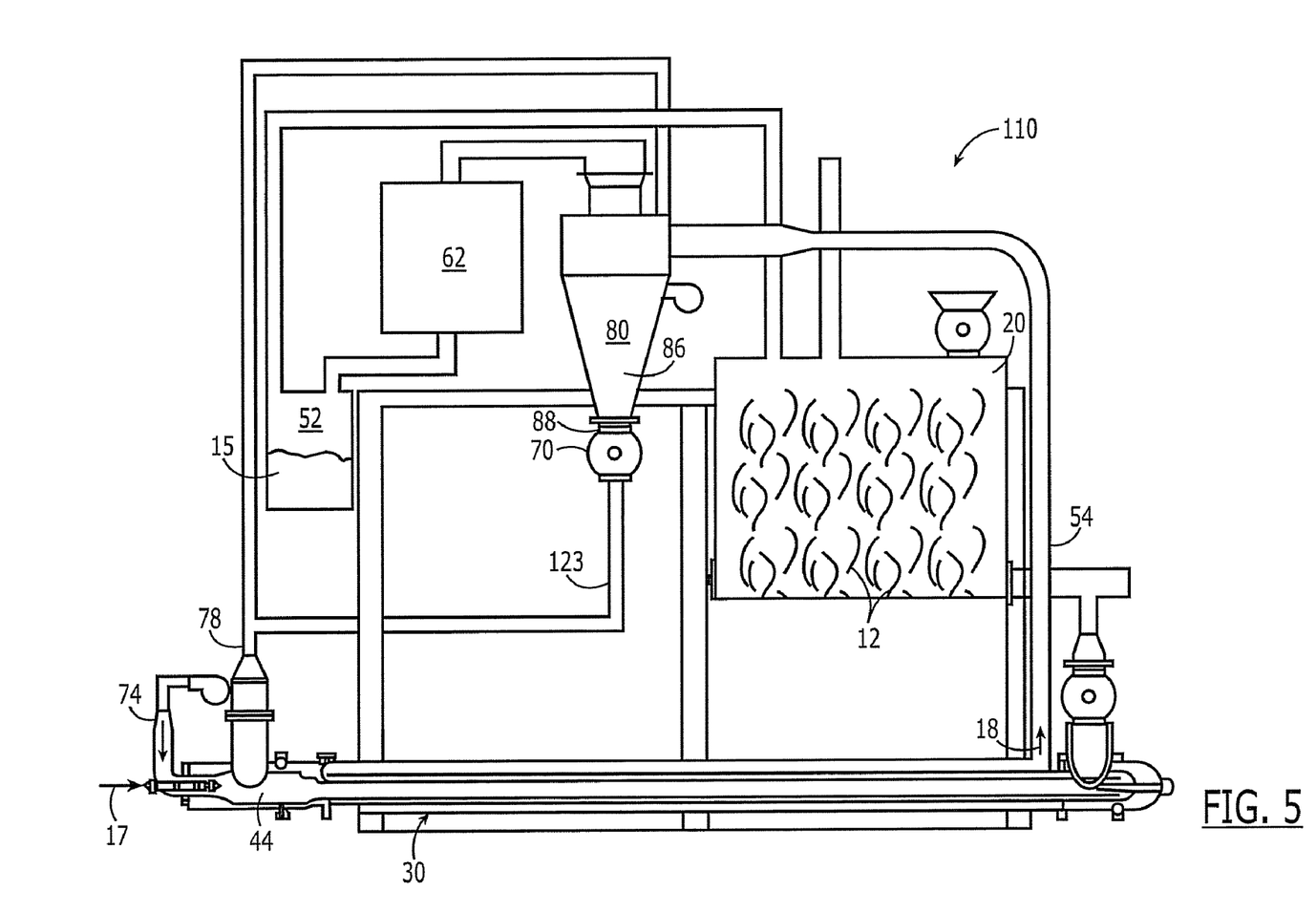
FIG. 5 is a schematic view of a second embodiment of a concentric chamber pyrolysis system in accord with the present invention.

FIG. 5 depicts a second embodiment of a concentric-chambered pyrolysis system, designated generally by reference numeral 110, in accordance with the present invention. In the present embodiment, substantially an entire amount of char 14 produced from pyrolytic reactions in a pyrolysis unit 30 is fed back into the system 110 to help fuel further pyrolytic reactions.

Referring now to FIG. 5, as particles of char 14 exit an open end 88 of a collection cone portion 86 of a cyclone separator 80, the char 14 enters a rotary air lock 70 attached to the open end 88. The rotary air lock 70 feeds the char 14 directly into a char feed duct 123. The char feed duct 123 leads to a char-air input duct 78. The char-air input duct 78, in turn, leads to a burn enclosure 44 of a pyrolysis unit 30. In this way, virtually all of the char 14 produced from pyrolysized biomass 12 is fed back into the system 110 and used to power further fast pyrolytic reactions. Additional fuel 17 (shown as an arrow), such as fuel oil or bio-oil 15, is added to the burn enclosure 44 as needed to ensure the system 110 continues to effect efficient fast pyrolytic reactions.

Regarding FIG. 5, note that unlike the concentric-chambered pyrolysis system 10 of the first embodiment shown in FIGS. 1-4, the system 110 does not require a char bin 24 or augers 68 to convey char 14 from the char bin 24 to the char-air input duct 78.

Figure 6:
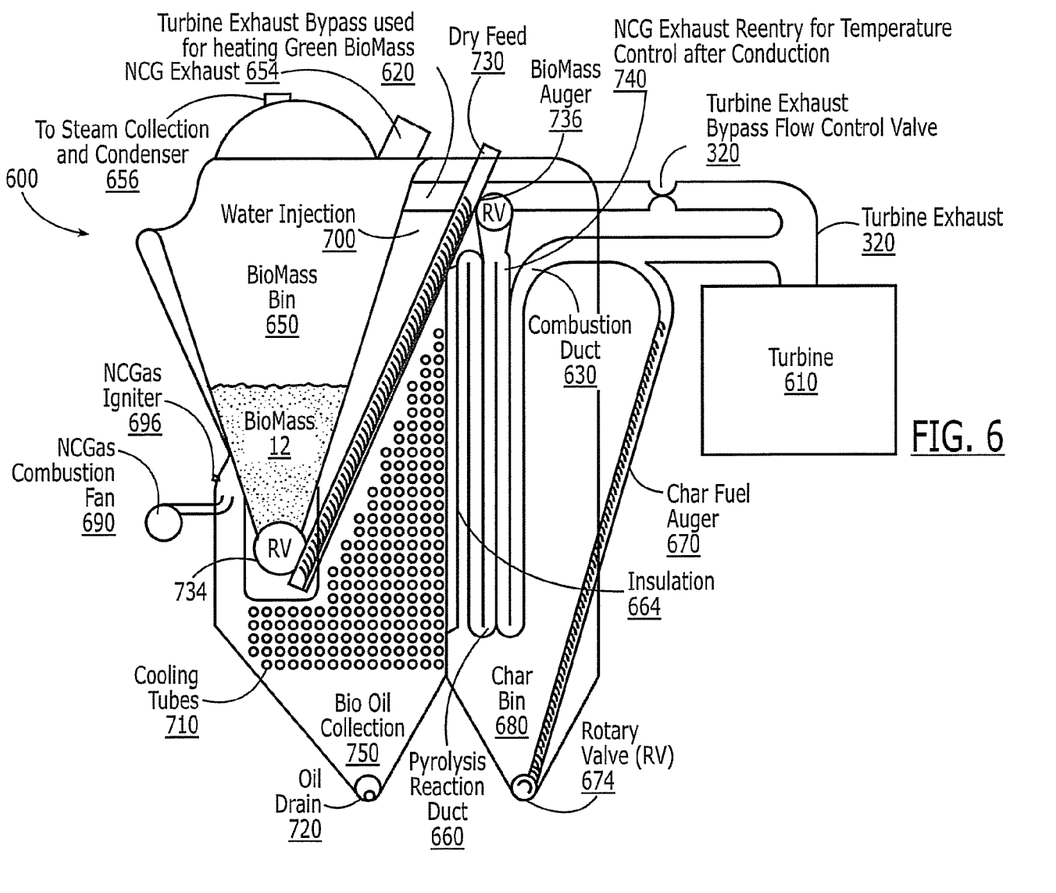
FIG. 6 is a third embodiment of a fast pyrolysis system in accordance with the present invention.

FIG. 6 is a third embodiment 600 of a system and apparatus using fast pyrolysis to produce energy products 210 from biomass 12, such as the waste or byproducts produced by a CNS facility 100. Referring to FIG. 6, a turbine 610 produces exhaust 320 during its operation. A turbine exhaust bypass duct 620 channels a portion of this exhaust 320 through a turbine exhaust bypass flow control valve 640 to a biomass bin 650. The flow control valve 640 controls the amount of exhaust 320 flowing from the turbine 610 to the bin 650. The control valve 640 is adjusted to allow only as much exhaust 320 to enter the bin 650 as is needed to dry and heat the biomass 110 to the desired moisture content and temperature. A combustion duct 630 channels the remainder of the exhaust 320 from the turbine 610 to a pyrolysis reaction duct 660. As fast pyrolysis reduces a portion of the biomass input 110 to char 270, the char 270 drops from the pyrolysis reaction duct 660 into a char bin 680. A char fuel auger 670 is connected to the char bin 680 on one end and to the combustion duct 630 on the other end. A rotary valve 674 resides between the char bin 680 and the fuel auger 670. The rotary valve 674 accepts char 270 from the char bin 680 and feeds it to the char fuel auger 670. The fuel auger 670 then draws the char 270 up into the combustion duct 630 and into the hot exhaust stream 320. The hot exhaust 320 is approximately five-hundred degrees Fahrenheit or greater at this point. The exhaust 320 also contains approximately fifteen percent oxygen. When char 270 is fed into the exhaust stream 320 by the fuel auger 670, the char 270 is combusted. The combustion of the char 270 burns off the remaining oxygen in the hot exhaust 320 and raises the temperature of the exhaust stream 320. Other types of fuel can be used here as well. An advantage to using char 270 as a fuel here, however, is that the char 270 does not produce smoke and any excess char is simply recollected in the char bin 680. Despite the type of fuel used, the objective is to remove the oxygen from the exhaust 320. It should be recognized that methods other than combustion can be used to remove the oxygen from the exhaust 320. The exhaust stream 320 then continues down the combustion duct 630 and into the pyrolysis reaction duct 660.

Returning now to the turbine exhaust bypass duct 620, exhaust 320 channels down the bypass duct 620 and arrives at the biomass bin 650. The biomass bin 650 receives raw biomass 110 destined for the pyrolysis reaction duct 660. The biomass 110 previously will have been ground to an appropriate size for the application. Grinding to appropriate size can include grinding the biomass into cubes 220 of between one-quarter and one-eighth inch, which is the suitable size for fast pyrolysis. The hot exhaust 320 from the bypass duct 620 heats the biomass 110 in the biomass bin 650 until the biomass is dry 230. "Dry" in this context means that the biomass 110 has a moisture content on the order of twelve percent. Also helping to dry the biomass 230 is one of the end products of the fast pyrolysis reaction, non-condensing gas 290, as discussed above. Non-condensing gas 290 is a mixture of gases consisting primarily of carbon monoxide and carbon dioxide. Mixed with the non-condensing gas 290 is bio-oil vapor, which is also an end product of the fast pyrolysis reaction. This mixture 285 of non-condensing gas 290 and bio-oil vapor is swept from the pyrolysis reaction duct 660 to a collection of cooling tubes 710. Here the bio-oil vapor condenses out of the mixture 285, leaving behind the non-condensing gas 290 still in gas form. A non-condensing gas combustion fan 690 is connected to the outside of the apparatus 600 between the cooling tubes 710 and the green biomass bin 650. The combustion fan 690 sucks in outside air to mix with the non-condensing gas 290. The air and gas 290 mixture is then blown by fan 690 toward a non-condensing gas igniter 696. The igniter 696 ignites the air and gas 290 mixture. The ignition completely burns off the carbon monoxide portion of the non-condensing gas 290. The combustion fan 690 then blows the resulting hot non-condensing gas exhaust 654 into the biomass bin 650. The non-condensing gas exhaust 654 is mainly composed of carbon dioxide, nitrogen, and a small amount of oxygen. The thermal energy of the non-condensing gas exhaust 654, combined with the thermal energy of the turbine exhaust 320 that was channeled to the biomass bin 650 via the turbine exhaust bypass duct 620, flashes into steam the moisture from the biomass 12, thus completing the drying process 230. In an alternate embodiment, the non-condensing gas exhaust 654 is vented to the atmosphere so as to prevent overheating of the biomass 12. In the present embodiment, however, the non-condensing gas exhaust 654 is channeled to the pyrolysis reaction duct 660 where it reenters 740 the duct 660. In this way, the burned non-condensing gas exhaust 654 helps to control the temperature of the pyrolysis reaction. Meanwhile, the steam from the drying process 230 is captured in a condenser 656 for reuse by the system. In an alternate embodiment, the steam is vented to the atmosphere.

A dry biomass feed auger 730 is connected to the biomass bin 650 on one end and to the pyrolysis reaction duct 660 on the other. A rotary valve 734 resides between the biomass bin 650 and the feed auger 730. The rotary valve 734 accepts dried biomass 12 from the biomass bin 650 and feeds it to the dry biomass feed auger 730. A second rotary valve 736 resides between the dry biomass feed auger 730 and the pyrolysis reaction duct 660. The feed auger 730 draws the biomass 12 up to the second rotary valve 736, where the valve 736 receives the biomass 110 and feeds it into the pyrolysis reaction duct 660. One end of the reaction duct 660 is oriented upward. Through this upward-oriented end the turbine exhaust 320 is received into the reaction duct 660. The opposite end of the pyrolysis reaction duct 660 is oriented downward. Once pyrolysis is completed, the resulting mixture 585 of non-condensing gas 290, bio-oil vapor, and char 270 exit the pyrolysis reaction duct 660 through this downward-oriented end. The biomass 12 enters the reaction duct 660 via the feed auger 730 and associated rotary valve 736 somewhere beyond where the turbine exhaust 320 entered. The biomass 12 is blown through the reaction duct 660 towards the downward-oriented end at speeds great enough to keep the biomass 12 suspended in the heat stream. The biomass 12 need only be subjected to pyrolytic temperatures for approximately two seconds to become pyrolysized.

Below the pyrolysis reaction duct 660 resides the char bin 680. The resulting pyrolysized mixture 585 of char 270, bio-oil vapor, and non-condensing gas 290 exit the downward-oriented end of the pyrolysis reaction duct 660. At this point, the particles of char 270 are allowed to slow to a velocity at which they will no longer be suspended, thus allowing the char 270 to drop to the bottom of the bin 680 where it is collected. Some of the char 270 will be moved by the char fuel auger 670 up into the combustion duct 630 and into the turbine exhaust 320 to help fuel pyrolysis. The remainder of the char 270 may be processed into other forms and sold, such as activated charcoal for filters or pellets for use in pellet stoves.

Near the pyrolysis reaction duct 660, and separated from it by insulation 664, are a collection of cooling tubes 710. The cooling tubes 710 contain a fluid, such as water or oil, that is recirculated through a heat exchanger to keep the tubes 710 cool. In an alternate embodiment, the heat energy lost to the heat exchanger will be captured and reused by the system. In the present embodiment, the mixture 285 of non-condensing gas 290 and bio-oil vapor exiting the pyrolysis reaction duct 660 is swept toward the cooling tubes 710. Water 700 is injected into the mixture 285 to aid in cooling it and to add water 700 to the condensing bio-oil. The additional water 700 decreases the viscosity of the condensed bio-oil. The bio-oil vapor condenses at approximately 140 degrees Fahrenheit. As it condenses, the bio-oil mixes with the water 700 and collects 750 at the bottom of the apparatus 600. The mixture of water 700 and bio-oil drains out through an oil drain 720 at the bottom of the apparatus 600. The non-condensing gas 290 is then channeled to the non-condensing gas combustion fan 690 where it is ignited to aid in drying the biomass 230 in the green biomass bin 650.

The fast pyrolysis systems disclosed above with reference to FIGS. 1-6 provide particular advantages for collocation at a facility that produces biomass in large quantities such as a sawmill and particularly CNS facilities. Using collocation techniques in accordance with the present invention, the large volume of biomass generated by the CNS facility permits the fast pyrolysis process to create bio-oil products that can be utilized to power the CNS facility. The specific details of such collocation techniques are described below with reference to FIGS. 7-12.

Figure 7:
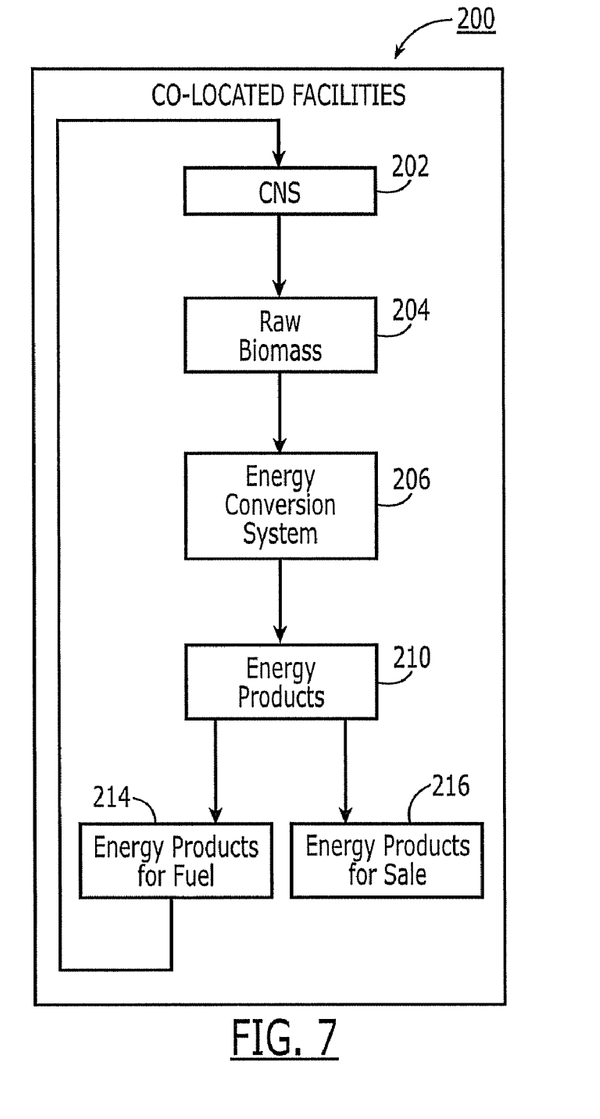
FIG. 7 is a flow diagram utilizing the fast pyrolysis systems and apparatus of the present invention for optimizing the production of energy products from biomass such as sawmill waste, utilizing the fast pyrolysis techniques of the present invention.

Referring to FIG. 7, a collocation of facilities 200 comprises a CNS facility 202 and a fast pyrolysis system 206 such as those described above with reference to FIGS. 1-6. Although a CNS facility 206 is shown in FIG. 7, the energy-conversion system 206 can be co-located with any facility that generates raw biomass 204. The energy-conversion system 206 produces energy products 210. Some of the energy products 210 are used by the CNS facility 202 to power its operations 214, while the remainder are sold as energy products 216. The CNS facility 202, in turn, supplies the energy-conversion system 206 with raw biomass 204, which the energy-conversion system 206 uses as input to the fast pyrolysis process to produce the energy products 210. In the context of the system 200, the raw biomass 204 generally consists of wood chips, sawdust, bark, wood shavings, and the like.

Figure 8:
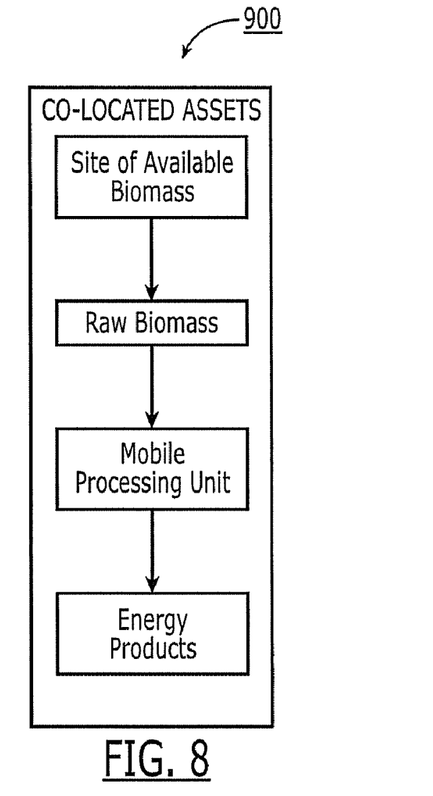
FIG. 8 is a flow diagram of another system for optimizing the production of energy products from biomass in accordance with this invention.'

Referring to FIG. 8, a collocation of assets 900 includes the collocation of a site where available biomass 204 is located together with a mobile processing unit utilizing a fast pyrolysis system 910. The site of available biomass 204 supplies a mobile processing unit 910 with raw biomass 204.

Figure 9:
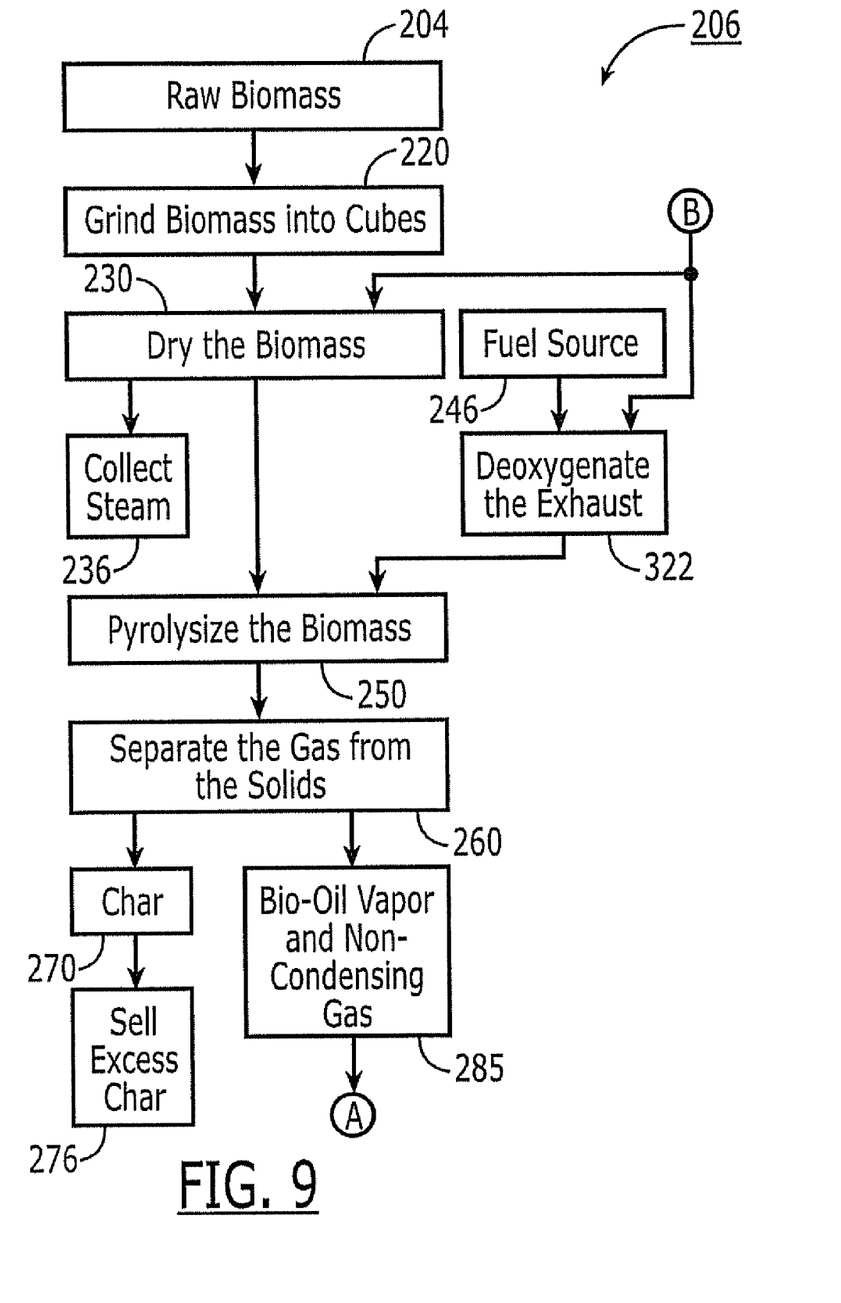
FIGS. 9 and 10 are flow diagrams of the conversion system shown in FIG. 7.
Figure 10:
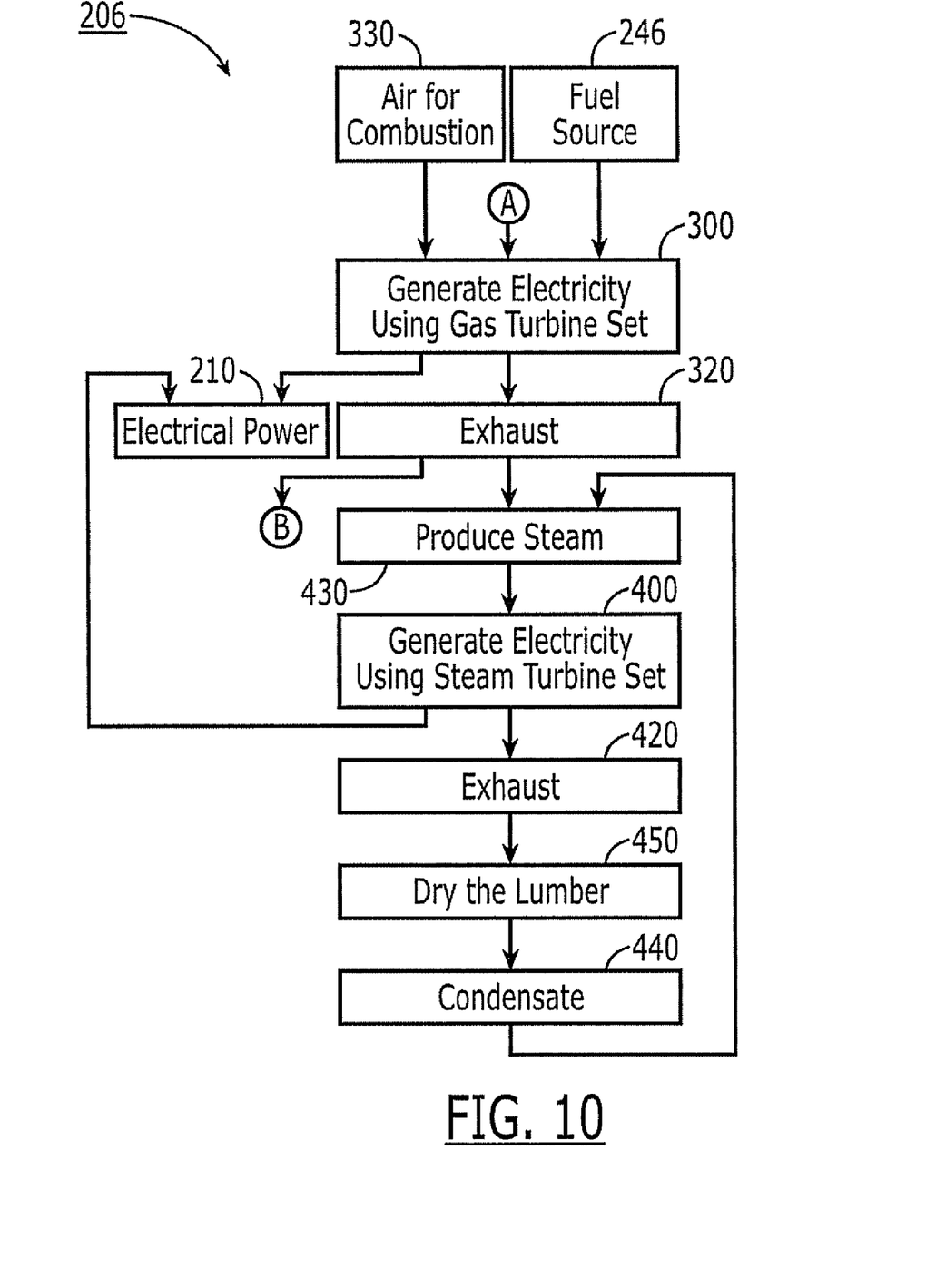

FIGS. 9 and 10 describe a preferred embodiment of the energy-conversion system 200 shown in FIG. 7. Referring first to FIG. 9, raw biomass 204 is ground into cubes at step 220. The ground biomass 204 is then subjected to drying 230. Optimally, the dried biomass 204 has a moisture content of no more than twelve percent. In other embodiments, steam resulting from the drying process 230 is collected for re-use by other parts of the system 200. Hot exhaust gas 320 from the fast pyrolysis system 206 is used in generating electricity 300 which, in turn, is used to aid in the drying process 230. The exhaust gas 320 has a typical temperature of approximately five-hundred degrees Fahrenheit or greater and has a typical oxygen content of approximately fifteen percent. A portion of the exhaust 320 is also used to aid in fast pyrolysizing the biomass 250. Before the exhaust 320 can be used for fast pyrolysis 250, however, it must be deoxygenated. To rid the exhaust 320 of its oxygen, a fuel source 246 is introduced into the hot exhaust stream 320. Optimally, the temperature of the exhaust 320 is great enough to ignite the fuel source 246, resulting in combustion that deoxygenates the exhaust 322. The thermal energy of the hot, deoxygenated exhaust 320 is then used in fast pyrolysizing the biomass 204. A variety of fuels can serve as the fuel source 246 as long as the fuel adheres to the characteristics required by the system 206. Non-condensing gas 290, bio-oil, char 270, and biomass 204 are a few examples of possible fuel sources 246. In an alternate embodiment, a single entry point for the biomass 204 and the fuel source 246 is used. The biomass 204 and fuel source 246 are introduced into the exhaust stream 320 together, thereby deoxygenating it. The raw biomass 204 itself can serve as the fuel source 246. The biomass 204 that is not combusted is then pyrolysized at step 250. In the present embodiment, fast pyrolysizing the biomass 204 yields char 270 combined with a mixture of bio-oil vapor and non-condensing gas 285. The char 270 is then separated 260 from this mixture of gases 285. The present embodiment 200 envisions using a cyclone or similar device to separate at step 260 the gas 285 from the char 270. Excess char 270 not used as fuel 250 is sold at step 276.

Referring to FIG. 10, the mixture of bio-oil vapor and non-condensing gas 285 is used as fuel by a gas turbine set to generate electricity at step 300. An additional fuel source 246 may also be introduced. Along with the fuel 246, 285, air 330 is also provided to foster combustion. In some embodiments, the bio-oil vapor will be separated from the non-condensing gas 290 of the mixture 285. The bio-oil vapor will then be condensed and either used as fuel or sold. The non-condensing gas 290 is combustible and is used to help fuel more than one process used by the system, such as powering a gas turbine set 300 and providing thermal heat to dry biomass 204 at step 230. Electrical power 210 generated by the gas turbine set 300 is used to help supply the power needs of the co-located CNS facility 200, as shown in FIG. 1, or is sold as an energy product 210. The generation of electricity 300 also produces exhaust 320. As mentioned earlier, the exhaust 320 is used to provide thermal energy to aid in drying the biomass 204 at step 230 and also to aid in fast pyrolysis 250 (see FIG. 9). The exhaust 320 is further used to help produce steam 430 for use by a steam turbine set to generate electricity 400. The steam-producing process 430 also uses condensate 440 from a process used to dry lumber at step 450. In some embodiments, an additional fuel source is introduced to help produce steam 430, with electrical power generated by the steam turbine set 400 being used to help supply the power needs of the co-located facility 200, as shown in FIG. 7, or is sold as an energy product 210. In generating electricity, the steam turbine set 400 also produces exhaust 420. The exhaust 420 is used to dry lumber at step 450. A liquid condensate 440 is a product of the drying 450. The condensate 440 is predominately made up of water and is circulated back into the steam-producing system 430 for use by the steam turbine set at step 400.

Figure 11:
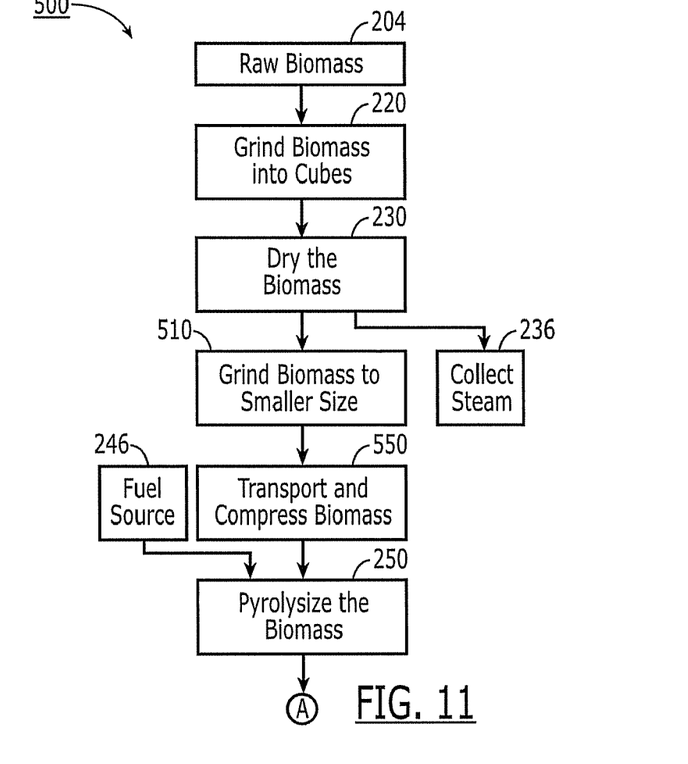
FIGS. 11 and 12 are a second embodiment of the system shown in FIG. 7.
Figure 12:
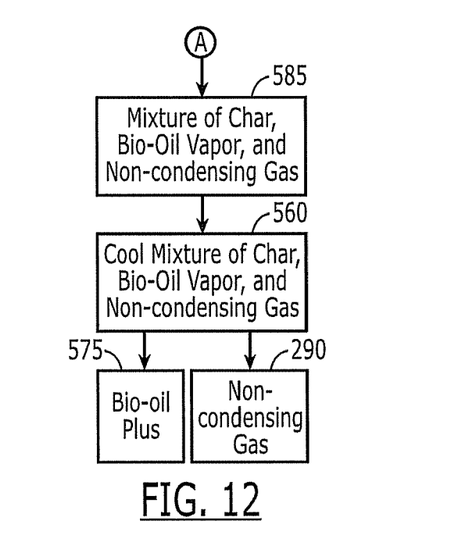

FIGS. 11 and 12 illustrate flow diagrams of another preferred embodiment 500 of an energy-conversion system 500 in accordance with this invention. Referring first to FIG. 11, raw biomass 204 is ground into cubes of between one-quarter and one-eighth inch. The ground biomass 110 is next subjected to drying 230. Steam from the drying process 230 is collected at step 236 for re-use by other parts of the system or vented to the atmosphere. The biomass 204 are now ground into a powder at step 510. The smaller particle size promotes a faster reaction time when subjected to fast pyrolysis. In the present embodiment 500, the particle size and shape are optimized for the production of bio-oil plus at step 575. In other embodiments, the process to grind the biomass to a smaller size 510 will be optimized for the production of bio-oil or other products. The dry powdered biomass 204 is compressed and transported at step 550 to a chamber where it is to be fast pyrolysized at step 250. The distance transported, and the particulars of compression, can be varied so as to optimize the production of the end-products sought. The powdered biomass 204 is then forced into a chamber under pressure where it is subjected to fast pyrolysis at step 250. A fuel source 246 supplies thermal energy to aid in the fast pyrolysis reaction 250. Optimally, the present embodiment 500 envisions pyrolysis taking no more than two seconds.

Referring now to FIG. 12, the output of the fast pyrolysis reaction 250 is a mixture of char, bio-oil vapor, and non-condensing gas 585. This mixture of end-products 585 is then cooled 560. The cooling process 560 causes the bio-oil vapor to condense and mix with the char in the mixture at step 585, thereby creating bio-oil at 575.

While the invention has been described with respect to certain specific embodiments, it will be appreciated that many modifications and changes may be made by those skilled in the art without departing from the spirit and scope of the invention.

What is claimed as new and what it is desired to secure by Letters Patent of the United States is:

1. An efficient biomass conversion method comprising the steps of:
   identifying a sawmill location where substantial quantities of biomass are generated;
   installing a fast pyrolysis unit at the sawmill location and providing the fast pyrolysis unit with a burn enclosure, a combustion chamber, an inner pyrolysis chamber and an outer pyrolysis chamber arranged generally concentrically such that the combustion chamber is innermost substantially surrounded by the inner and outer pyrolysis chambers, and with a first proximal end of the combustion chamber extending from and in communication with an end of a rearward portion of the burn enclosure, and a second distal end of the combustion chamber in communication with a first proximal end of the inner pyrolysis chamber, and a second distal end of the inner pyrolysis chamber in communication with a first proximal end of the outer pyrolysis chamber;
   feeding biomass generated at the sawmill into the fast pyrolysis unit under pyrolytic reaction conditions including injecting an admixture of air and fuel under pressure into the burn enclosure and igniting the admixture to facilitate combustion of the admixture in a first direction through the combustion chamber while simultaneously deoxygenating the combustion chamber;
   introducing biomass into the pyrolysis unit at a location proximal to both the second end of the combustion chamber and the first end of the inner pyrolysis chamber, in the presence of sufficient temperature and in the substantial absence of oxygen to cause pyrolysis of the biomass to occur along the length of the inner pyrolysis chamber between the first and second ends thereof;
   removing exhaust gases containing entrained matter resulting from pyrolytic reactions within the fast pyrolysis unit;
   separating and collecting bio-fuel entrained in the exhaust gases; and
   using at least a portion of the collected bio-fuel to power the sawmill.

2. The method recited in claim 1 further comprising the steps of:
   separating and collecting entrained char from the exhaust gases; and
   channeling the separated char to a char bin for storage.

3. The method recited in claim 2 further comprising the step of feeding a portion of the separated char into the fast pyrolysis unit to produce additional heat and assist in deoxygenation.

4. The method recited in claim 1 further comprising the step of condensing bio-oil vapor entrained in the exhaust gases to a condensing temperature, and then collecting the bio-oil condensate.

5. The method recited in claim 1 further comprising the steps of:
   placing the biomass in a biomass feed bin; and
   passing the exhaust gases separated from the entrained char and the entrained bio-oil vapor through the biomass in the biomass feed bin to filter the exhaust gases.

6. The method recited in claim 1 further comprising the steps of:
   identifying a second sawmill location where substantial quantities of biomass are generated; and then
   moving the fast pyrolysis unit to the second sawmill location.

7. The method recited in claim 6 further comprising the steps of:
   feeding biomass generated at the second sawmill into the fast pyrolysis under pyrolytic reaction conditions;
   removing exhaust gases containing entrained matter resulting from pyrolytic reactions with the fast pyrolysis unit;
   separating and collecting bio-fuel entrained in the exhaust gases; and
   using at least a portion of the collected bio-fuel to power the second sawmill.

8. The method recited in claim 1 further comprising the step of fitting a capturing and channeling means proximal to the second end of the outer pyrolysis chamber to effectuate removal of the exhaust gases.

9. The method recited in claim 8 further comprising the step of mounting the fast pyrolysis unit within a framework of vertical and horizontal structural members which permit the unit to be easily transported between sawmills.

10. The method recited in claim 9 further comprising the step of fabricating the fast pyrolysis unit so as to have a footprint permitting the unit to be mounted upon a flat bed truck.

11. An efficient biomass conversion system comprising:
   a fast pyrolysis unit installed at a sawmill location where substantial quantities of biomass are generated, the fast pyrolysis unit comprising a burn enclosure, a combustion chamber, an inner pyrolysis chamber and an outer pyrolysis chamber arranged generally concentrically such that the combustion chamber is innermost substantially surrounded by the inner and outer pyrolysis chambers, and with a first proximal end of the combustion chamber extending from and in communication with an end of a rearward portion of the burn enclosure, and a second distal end of the combustion chamber is in communication with a first proximal end of the inner pyrolysis chamber, and a second distal end of the inner pyrolysis chamber is in communication with a first proximal end of the outer pyrolysis chamber;
   means for introducing biomass into the pyrolysis unit at a location proximal to both the second end of the combustion chamber in the presence of sufficient temperature and in the substantial absence of oxygen to cause pyrolysis of the biomass to occur along the length of the inner pyrolysis chamber between the first and second ends thereof;
   means for injecting an admixture of air and fuel under pressure into the burn enclosure;
   means for igniting the admixture in the burn enclosure to facilitate combustion of the admixture in a first direction through the combustion chamber while simultaneously deoxygenating the combustion chamber;

means for removing exhaust gases containing entrained matter resulting from pyrolytic reactions within the fast pyrolysis unit;

means for separating and collecting bio-fuel entrained in the exhaust gases; and wherein means are fitted between the separation and collection means and the sawmill to permit use of at least a portion of the collected bio-fuel to power the sawmill.

12. The system recited in claim 11 further comprising:

means for separating and collecting entrained char from the exhaust gases; and means for feeding a portion of the separated char into the fast pyrolysis unit to produce additional heat and to assist in deoxygenation.

13. The system recited in claim 11 further comprising:

a framework of vertical and horizontal structural members dimensioned to permit the system to be easily transported from one biomass source to another; and wherein the fast pyrolysis unit is fitted with the framework of vertical and horizontal structural members.

14. The system recited in claim 11 further comprising:

a biomass feed bin;

means for feeding the biomass from the feed bin into the fast pyrolysis unit; and means for passing the exhaust gases through the biomass to filter the exhaust gases.

15. The system recited in claim 11 comprising:

means proximal to the second end of the outer pyrolysis chamber to capture and remove the exhaust gases.

\* \* \* \* \*